US005497501A

United States Patent [19]
Kohzono et al.

[11] Patent Number: 5,497,501
[45] Date of Patent: Mar. 5, 1996

[54] DMA CONTROLLER USING A PREDETERMINED NUMBER OF TRANSFERS PER REQUEST

[75] Inventors: Ichiro Kohzono; Tsuyoshi Katayose, both of Tokyo, Japan

[73] Assignee: NEC Corporation, Tokyo, Japan

[21] Appl. No.: 147,034

[22] Filed: Nov. 1, 1993

Related U.S. Application Data

[63] Continuation of Ser. No. 704,298, May 22, 1991, abandoned.

[30] Foreign Application Priority Data

May 22, 1990 [JP] Japan .................................. 2-131818

[51] Int. Cl.⁶ .................................................. G06F 13/00
[52] U.S. Cl. ................... 395/849; 395/842; 395/880; 395/854; 395/826
[58] Field of Search ................... 364/200, 900; 395/425, 325, 886, 849, 842, 880, 854, 826, 872, 846, 856, 404; 348/513

[56] References Cited

U.S. PATENT DOCUMENTS

| | | | |
|---|---|---|---|
| 4,494,196 | 1/1985 | Greer | 395/880 |
| 4,797,812 | 1/1989 | Kihara | 395/846 |
| 4,797,851 | 1/1989 | Suzuki | 395/846 |
| 4,951,143 | 8/1990 | Waehner | 348/513 |
| 4,958,277 | 9/1990 | Hill et al. | 395/872 |
| 5,018,098 | 5/1991 | Taniai et al. | 395/842 |
| 5,056,010 | 10/1991 | Huang | 395/404 |
| 5,062,073 | 10/1991 | Masuda et al. | 395/856 |
| 5,104,187 | 4/1992 | Debize et al. | 395/886 |

Primary Examiner—Tod R. Swann
Assistant Examiner—J. Peikari
Attorney, Agent, or Firm—Whitham, Curtis, Whitham & McGinn

[57] ABSTRACT

A data transfer controller for transferring data between a memory and a peripheral unit enhances the efficiency of the DMA transfer by performing data transfer a predetermined number of times for each transfer request from the peripheral unit. The data transfer controller comprises a first register for storing address information for accessing a source area storing data to be transferred, a second register for storing first information relative to a number of data units ready to be transferred, and a third register for storing second information relative to a number of times by which a data transfer is performed in response to each transfer request from the peripheral unit. A data transfer from the source area to a destination area is performed a number of times designated by the second information in response to each transfer request. A transfer completion signal is generated when the number of data units transferred reaches the number designated by the first information.

19 Claims, 9 Drawing Sheets

DMA CONTROLLER USING A PREDETERMINED NUMBER OF TRANSFERS PER REQUEST

This application is a file wrapper continuation of application Ser. No. 07/704,298, filed May 22, 1991, now abandoned.

BACKGROUND OF THE INVENTION

This invention relates to a data transfer controller for transferring data between a memory and a peripheral unit in a direct memory access (referred to as "DMA" hereinafter) manner.

DESCRIPTION OF THE PRIOR ART

In a data processing system using a microcomputer, it is frequently required to transfer data between a peripheral unit and a memory. If such a data transfer is performed by a central processing unit (referred to as "CPU" hereinafter) through an interrupt program routine responsive to an interrupt request from the peripheral unit, the so-called overhead for shifting the program process to the interrupt routine is increased deteriorating the data processing efficiency. Therefore, as well known in the art, a DMA controller is provided for transferring data between a peripheral unit and a memory without intervention of the CPU, i.e. without intervention of a software program.

A DMA controller needs control and parameter information for performing the data transfer. This information is fed from the CPU. When the DMA controller receives a data transfer request from a peripheral unit such as a communication control circuit, a display control circuit or a printer, it requires a bus control right from the CPU. In response thereto, the CPU halts the current program processing and then transfers the bus control right to the DMA controller. Thus, the DMA controller starts to perform data transfer between a peripheral unit and a memory. As the data transfer by the DMA controller continues, units of data are transferred between the memory and the peripheral unit by the number designated by the CPU. When the data transfer is completed, the DMA controller supplies a completion signal to the peripheral unit and the CPU. In response thereto, the peripheral unit copes with any necessary procedure including prohibition against DMA transfer, whereas the CPU prepares data to be next transferred and then reinitializes the DMA controller to write new control and parameter information into the DMA controller.

Some peripheral units, a printer in particular, require only a few bytes of data per one DMA request and frequently issues such a DMA request. In this case, the DMA transfer completion condition frequently occurs, so that the CPU must perform the reinitialization process for the controller to write thereinto necessary information such as a DMA startup address, the number of data to be transferred and so on. This means that the CPU is required to have a correspondingly greater burden for the DMA controller. Moreover, the DMA controller refuses to accept the DMA transfer request until the reinitialization by the CPU is completed, resulting in lowering in efficiency of DMA transfer.

BRIEF SUMMARY OF THE INVENTION

It is therefore an object of the present invention to provide an improved data transfer controller.

It is another object of the present invention to provide a DMA controller for enhancing the efficiency of DMA transfer without requiring a heavy program load of the CPU.

A data transfer controller according to the present invention comprises a first register for temporarily storing address information for accessing a source area, a second register for temporarily storing first information relative to the number of data units ready to be transferred, a third register for temporarily storing second information relative to the number of times by which a data transfer is performed in response to each transfer request, a data transfer circuit responding to a transfer request and the address information to perform the data transfer from the source area to a destination area by the number of times designated by the second information, and a transfer completion circuit for generating a data transfer completion signal when the number of data units transferred by the data transfer circuit reaches the number designated by the first information.

Thus, the controller does not generate the data transfer completion signal even when the data transfer responsive to one transfer request is completed. The completion signal is generated when the data transfer responsive to one transfer request is performed a predetermined number of times to transfer all the data ready to be transferred from the source area to the destination area.

BRIEF DESCRIPTION OF THE DRAWINGS

The above and other objects, features and advantages of this invention will become more apparent from the following detailed description taken in conjunction with the accompanying drawings, wherein.

DETAILED DESCRIPTION OF THE INVENTION

Figure 1:
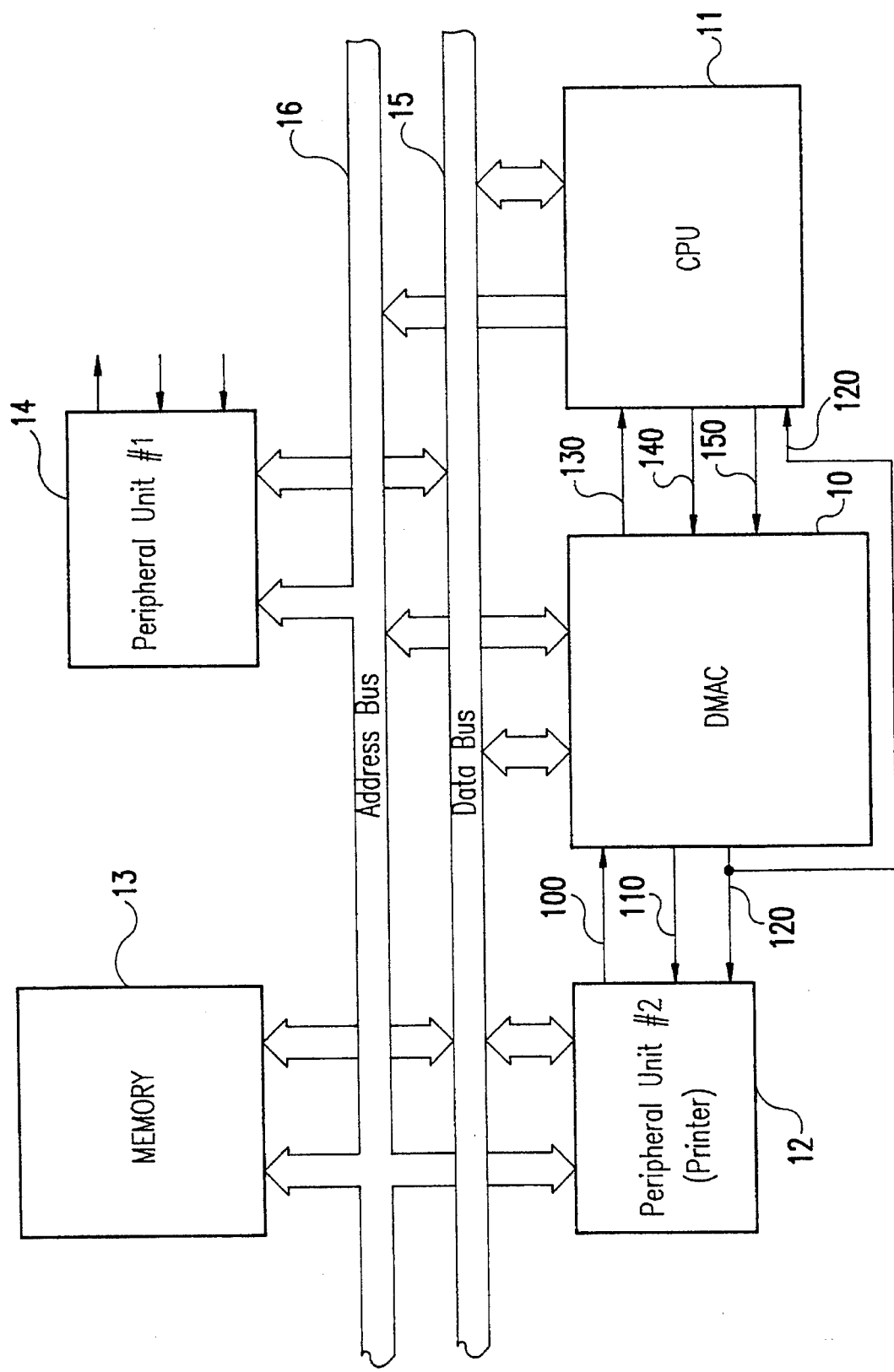
FIG. 1 is a block diagram of a data processing system equipped with a DMA controller according to a first embodiment of the present invention.

Referring to FIG. 1, a data processing system includes a DMA controller (referred to as "DMAC" hereinafter) 10 according to a first embodiment of the present invention. The data processing system further includes a CPU 11, a printer 12 as a first peripheral unit, a second peripheral unit 14, and a memory 13. The DMAC 10 performs a data transfer between the memory 13 and the peripheral unit 12 or 14. Data and address buses 15, 16 interconnects the respective units 10 through 14 to one another.

The data received by the peripheral unit 14 from an external I/O device (not shown) is transferred to memory 13 under the control of DMAC 10. The CPU 11 processes the data, and the processed data are transferred to the peripheral unit 12.

The unit 12 controls the printing operation in response to the data sent.

CPU 11 contains a program counter, program status word, various control registers and so forth (all not shown), executes a storing of instructions and controls the relinquishment and gaining of usage of the data bus 15 and address bus 16 to and from DMAC 10.

Memory 13 includes a program memory storing a program for CPU 11 and a data memory for storing various data for CPU 11 and DMAC 10. The data memory in memory 13 contains an area assigned for DMA transfer.

DMAC 10, on receiving a DMA request signal 100 from the peripheral unit 12, sends a bus control request signal 130 to CPU 11, and on receiving a bus-control acknowledge signal 140 from CPU 11, sends a DMA acceptance signal 110 to the peripheral unit 12. Then it performs the DMA transfer.

In operation, when CPU 11 prepares in the memory 13 data to be transferred to the unit 12, it initializes DMAC 10 to write the initial address for DMA transfer, the number of times by which DMA transfer is performed or repeated in response to each DMA request, the number of data units to be transferred or prepared, and so forth, by the program execution. Thereafter, CPU 11 proceeds to execute the program for other data processing. When DMAC 10 receives the DMA request signal 100, it sends the bus-control request signal 130 to CPU 11. CPU 11 arbitrates requests from other peripheral circuits, and, if there is no interrupt request higher in priority than the bus request of the DMAC, sends a bus-control acknowledge signal 140 to DMAC 10.

On receiving bus-control acknowledge signal 140, DMAC 10 transmits to peripheral device 12 one word of data stored at the initial address in the memory area in memory 13 based on the preset initial address. The DMA address is thereafter incremented or decremented. DMAC 10 transmits to peripheral device 12 the next one word of data stored at the next address in memory 13 based on the updated DMA address. Similar DMA transfer is repeated the preset number of times.

After the DMA transfer has been repeated the preset number of times, DMAC 10 withdraws the bus-control request signal 130 to return the usage right of the buses 15 and 16 to CPU 11. CPU 11 thereby resumes the program execution. The updated DMA address remains in DMAC 10.

Again, on receiving the DMA request signal 100 from the peripheral unit 12, DMAC 10 sends the bus-control request signal 130 and then receives the bus-control acknowledge signal 140. The DMA transfer is thereby performed by use of the DMA address previously updated. After the DMA transfer is repeated the preset number of times, the bus-control request signal 130 is withdrawn, as mentioned above. When all the data which had been prepared by CPU 11 in the memory 13 have been transferred to the unit 12 by the repetition of the DMA transfer described above, DMAC 10 produces the DMA end signal 120 to CPU 11 and the peripheral unit 12. In response to the signal 120, CPU 11 prepares new data to be transferred to the unit 12 and then initializes DMAC 10 to write the control and parameter data for performing the next DMA transfer operation on the newly prepared data.

According to the system as described above, even if the peripheral unit 12 as a printer requires only a few words, four words for example, per one data transfer request, CPU 11 is free from the DMAC initialization process responsive to the completion of each data transfer. The repetition of the DMA transfer responsive to each data transfer request can be accomplished so far as data to be transferred are stored in successive addresses of the memory 13.

Figure 2:
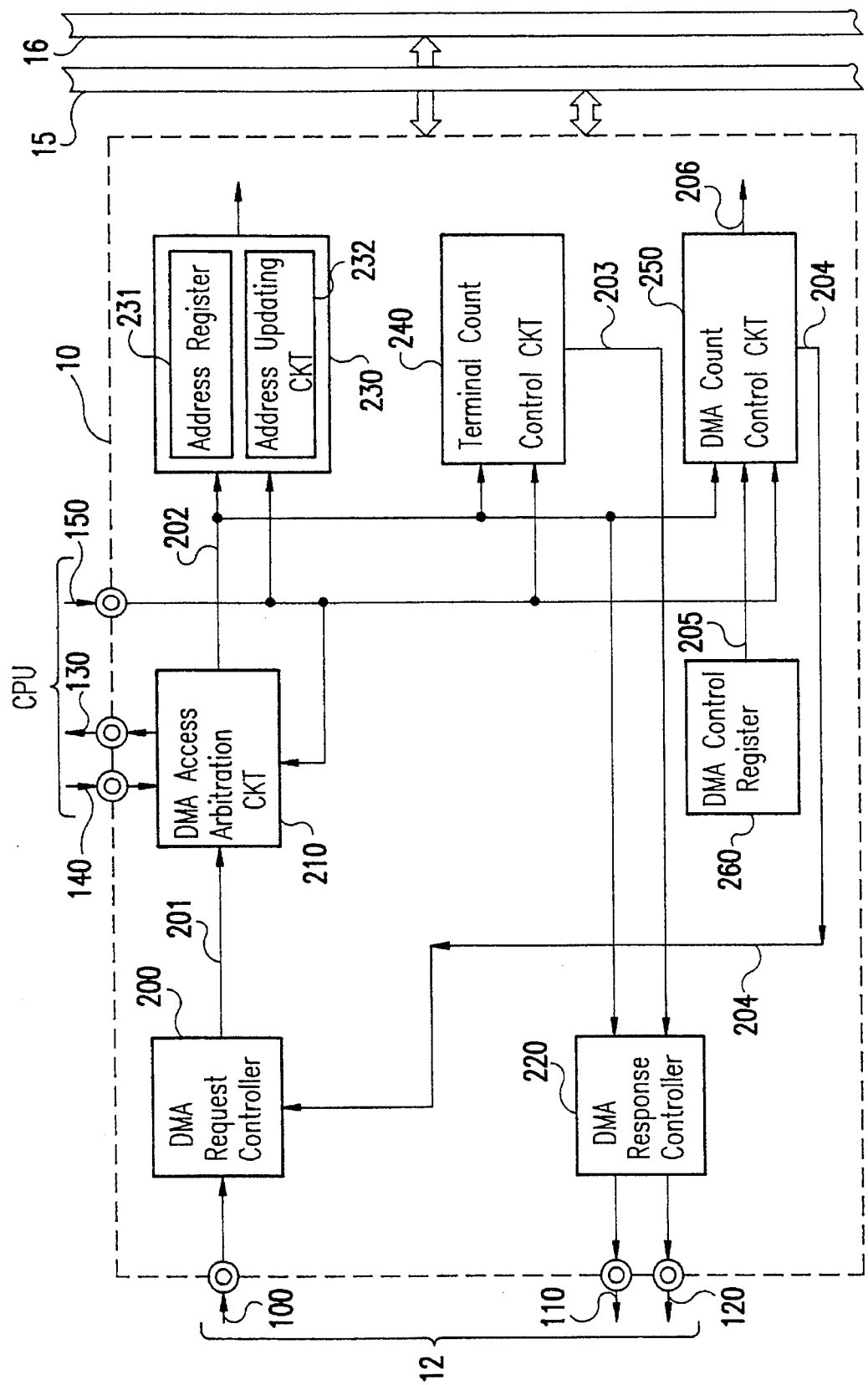
FIG. 2 is an internal block diagram of the DMA controller shown in FIG. 1.

Turning to FIG. 2, DMAC 10 includes a DMA request control circuit 200 which, once the request signal 100 is received, outputs a request flag signal 201, and on receiving an equality-detected signal 204 described later, stops the request flag signal 201. A DMA access arbitration circuit 210 which, on receiving the request flag signal 201, outputs a bus control request signal 130 to CPU 11 (FIG. 1), and on receiving a bus control acknowledge signal 140 from CPU 11, outputs a DMA execution acknowledge signal 202. A DMA address generating circuit 230 includes an address register 231 for storing the address for accessing the memory 13 and an address updating circuit 232 for incrementing or decrementing the content of the register 231. The DMAC 10 also includes terminal count control circuit 240, a DMA count control circuit 250, a DMA control register 260 for temporarily storing control information such as information representative of whether the DMA count control circuit 250 is activated or not, this information being outputted as an activation control signal 205 to DMA count control circuit 250, and a DMA response control circuit 220 which, on receiving the DMA execution acknowledge signal 202, sends the DMA acceptance signal 110 representative of execution cycle of DMA transfer to the peripheral equipment 12, and on receiving a DMA end detection signal 203, sends out a DMA end signal 120 to CPU 11 and unit 12. The respective circuits 210, 230, 240 and 250 run in synchronism with a bus-cycle reference signal 150 supplied from CPU 11.

Figure 3:
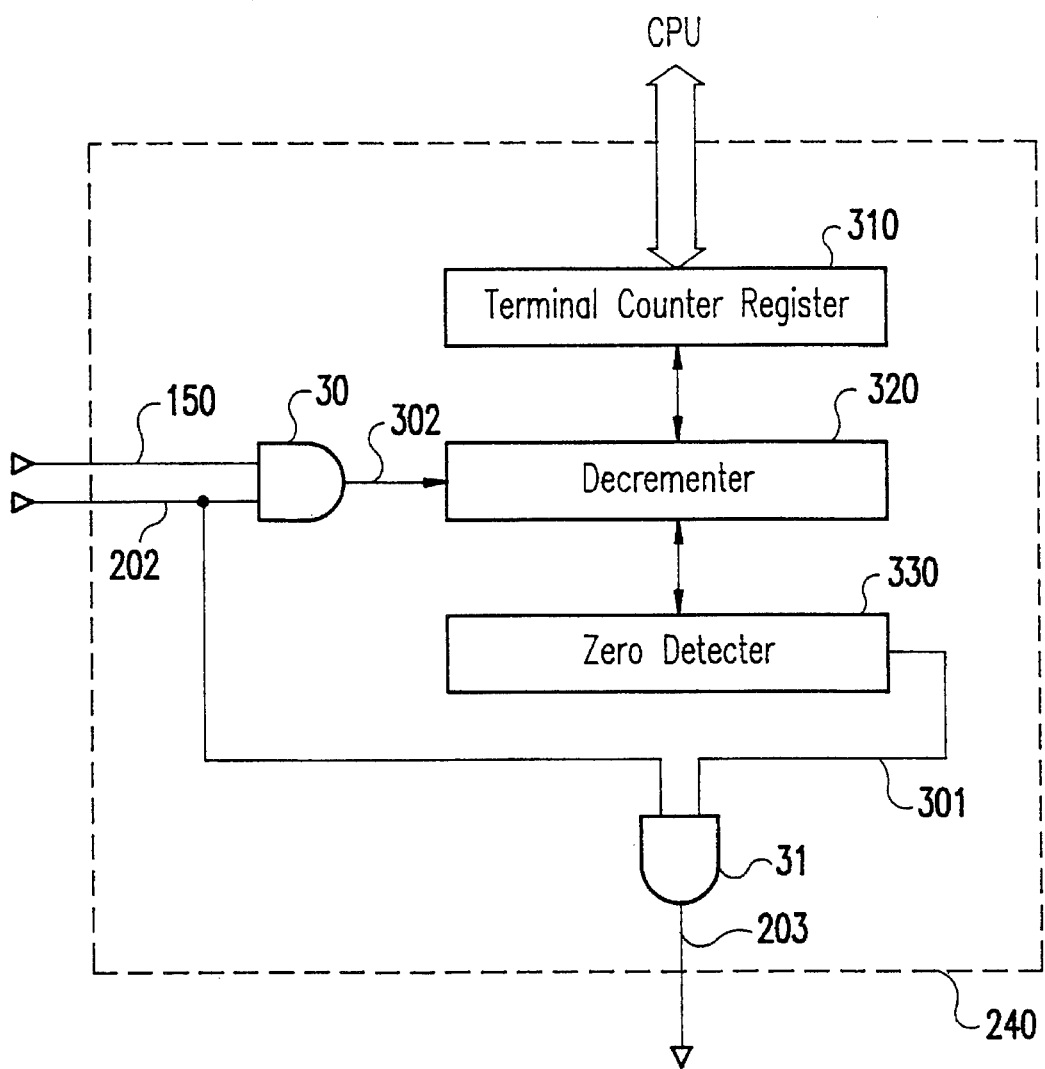
FIG. 3 is a block diagram of a terminal count control circuit shown in FIG. 2.

Referring to FIG. 3, the terminal count control circuit 240 includes a terminal count register 310 for storing information representative of the number of data units ready to be transferred and stored in the memory 13, a decrementer 320 which, each time the data transfer is performed, reads out the content of terminal count register 310, decrements it by one, and restores the resultant data to the register 310, a zero detection circuit 330 supplied with the resultant data, and AND gates 30 and 31. The zero detection circuit 330 produces a zero detection signal 301 when the data from the decrementer 320 becomes "0". The AND gate 30 activates the decrementer 320 through a signal 302 when both the bus cycle reference signal 150 and DMA execution acknowledge signal 202 take an active level. The AND gate 31 responds to the zero detection signal 301 and the DMA execution acknowledge signal 202 to produce the DMA end detection signal 203.

Figure 4:
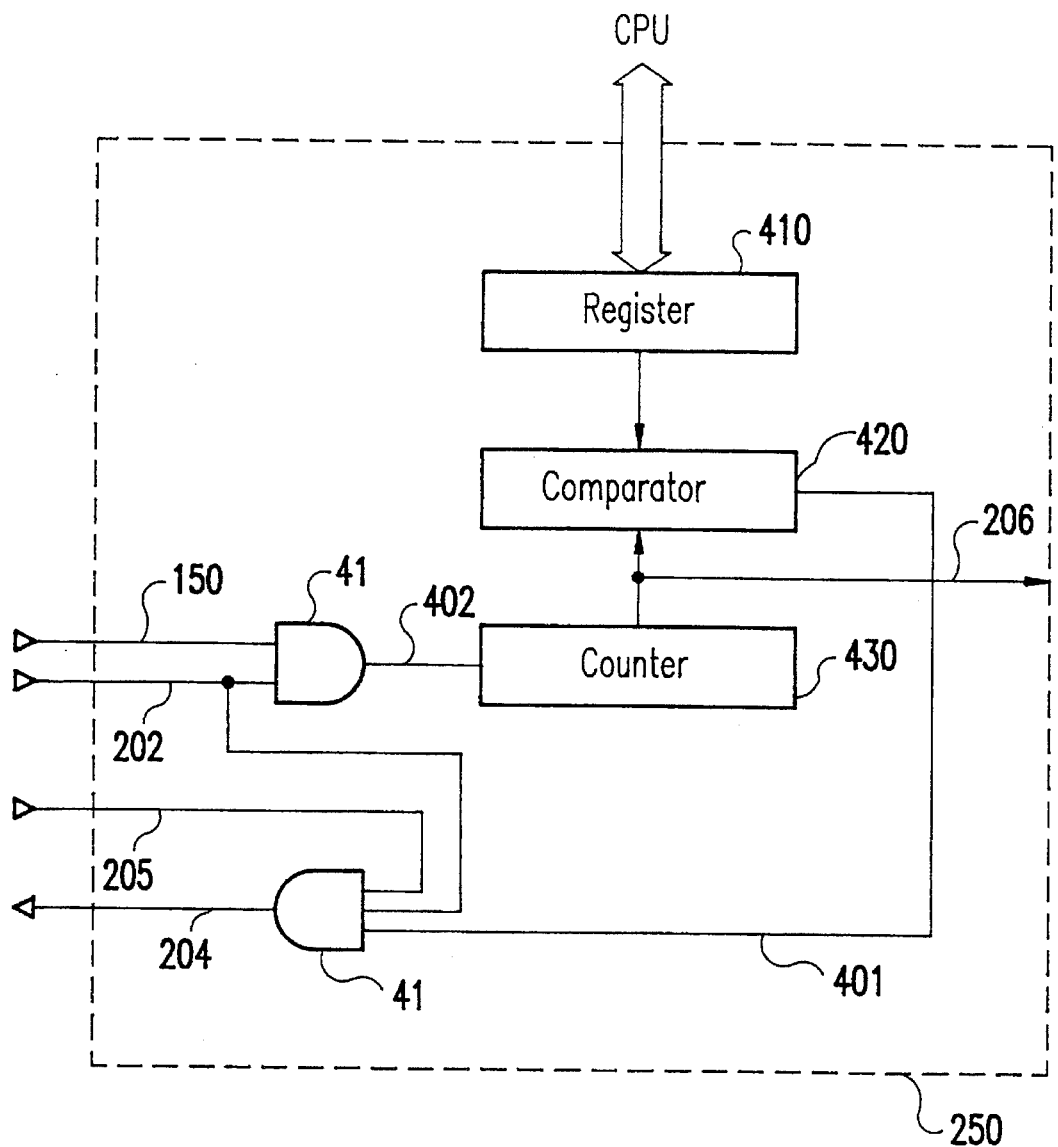
FIG. 4 is a block diagram of a DMA count control circuit shown in FIG. 2.

Turning to FIG. 4, the DMA count control circuit 250 includes register 410 for storing information representing the number of times by which the data transfer is repeated or performed (i.e., representing how many times the data transfer is performed) in response to one transfer request, a counter 430 incremented each time DMA transfer is performed, a comparator 420 comparing the content of the register 410 with that of counter 430 to produce an equality signal 401 when both of them become equal to each other, an AND gate 41 for producing a count signal 402 in response to the bus cycle reference signal 150 and the DMA acknowledge signal 202, and an AND gate 42 for producing the signal 204 in response to the DMA acknowledge signal 202, the activation control signal 205 and the equality detection signal 401.

Further detailed description on an operation will be made below with reference to FIGS. 1 to 4 and further to FIGS. 5 and 6.

Assume that the peripheral unit (printer) 12 needs four words per one data request. Data to be transferred to the unit 12 are prepared by CPU 11 and then stored in a source area B1 of the memory 13 as shown in FIG. 6. The area B1 has a starting address TA. The data to be transferred are stored from the starting address TA up to an address EA+1. The number of data units is assumed to be forty in the present description.

CPU 11 continues to execute a program and then initialize DMAC 10. More specifically, the DMA control register 260 is set with information representing the number of bits to be transferred by each DMA-transfer procedure and with mode information representing the activation of the DMA count control circuit 250. In this embodiment, the number of bits to be transferred at a time is one word, that is, sixteen bits. The activation control signal 205 goes to the active state (high level). The address register 231 (FIG. 2) is set with the starting address TA (FIG. 6). The terminal count register 310 is set with "40" and the register 410 is set with "3". The counter 430 is initially reset.

After this initialization, CPU 11 proceeds to the program execution for other data operations while continuously checking the generation of the bus control request signal 130 from DMAC 10.

On the other hand, when the peripheral device 12 is commanded to start printing, it produces the DMA request signal 100 to DMAC 10. In response to the signal 100, the DMA request control circuit 200 activates the request flag 201 (see bus cycle (A) in FIG. 5). In response thereto, the DMA access arbitration circuit 210 sends the bus control request signal 130 to CPU 11.

CPU 11, on receiving bus-control request signal 130, halts its current program processing by holding the contents of the program counter (PC), the program status 10 word (PSW) and the various registers as they are and by bringing bus terminals to a high impedance state, and then returns the bus control acknowledge signal 140 to DMAC 100.

Figure 5:
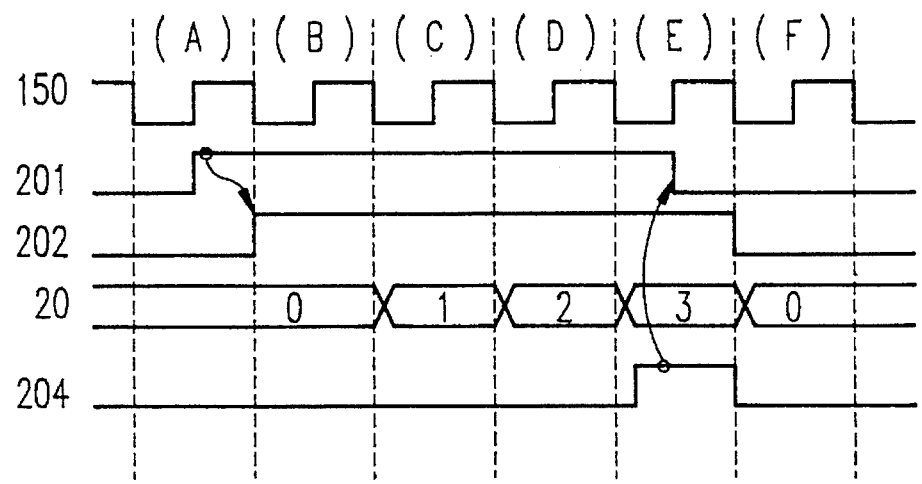
FIG. 5 is a timing chart for illustrating an operation of the first embodiment of the present invention.
Figure 6:
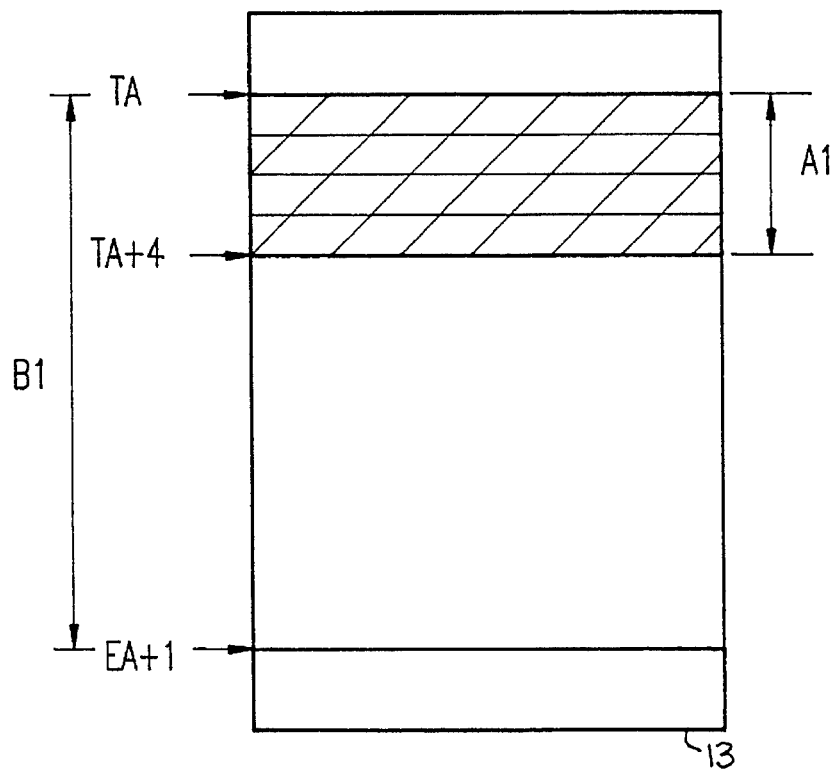
FIG. 6 is a memory map for illustrating an operation of the first embodiment of the present invention.

In response thereto, the DMA access arbitration circuit 210 changes the DMA execution acknowledge signal 202 to the active level (see bus cycle (B) in FIG. 5) to initiate the DMA execution cycle.

In the DMA execution cycle, in synchronism with the bus cycle reference signal 150, a read bus cycle is initiated by DMAC 10 using the content (address TA at the startup) of address register 231 (FIG. 2) to read out the data stored in the address TA of the memory 13. This data is in turn transferred to the peripheral device 12 via the data bus 15. The content of the address register 231 is thereafter updated to a next address (TA+1) by the circuit 232. In the terminal count control circuit 240, since the DMA execution acknowledge signal 202 is in the active (high) level, the signal 302 (FIG. 3) is generated to command the decrementer 320 to decrement the content of the register 310 by one. In the DMA count control circuit 250, the count signal 402 (FIG. 4) is generated to increment the content of the counter 430 by one (see bus cycle (C) in FIG. 5). The count value of counter 430 may be outputted as a count signal 206 to indicate whether or not DMA transfer is being executed.

When the DMA transfer is repeated four times, i.e. when four words of data are transferred to the unit 12, the content of counter 430 becomes "3" (see bus cycle (E) in FIG. 5), so that the comparator 420 produces the signal 401. Since both the DMA execution acknowledge signal 202 and the control signal 205 are at the high level, the signal 204 is generated (see the (E) in FIG. 5). In response to the signal 204, the DMA request control circuit 200 withdraws the request flag signal 201. This causes the DMA access arbitration circuit 210 to stop the generation of the bus control request signal 130 and changes the DMA execution acknowledge signal 202 to an inactive low level (see bus cycle (E) in FIG. 5).

By the above-described process four words of data stored in the area A1 of the memory 13 are transferred to the peripheral unit 12. After this, the content of address register 231 represents the address "TA+4". Similarly, the content of the terminal count register 310 is updated to the value "36". The counter 430 is automatically initialized to "0" (see the bus cycle (F) FIG. 5).

On the other hand, since the signal 130 is withdrawn, CPU 11 resumes the suspended program execution by use of the contents of the PD, PSW and various other registers.

When the peripheral unit 12, produces again the DMA request signal 100, the DMA data transfer is again initiated in the manner as described above and performed four times based on information stored in the address registers 231 and 310. Each time the DMA request signal 100 is produced, the DMA transfer is repeated four times. When forty words of data, i.e. all the data stored in the area B1 of the memory 13 has been transferred to the unit 12, the content of the terminal count control register 310 goes to "0". The circuit 330, thereby produces the zero detection signal 301. Since the DMA execution acknowledge signal 202 is at high level, the DMA end detection signal 203 goes to the active high level. In response to the DMA end detection signal 203, the DMA response control circuit 220 sends the DMA end signal 120 to the peripheral unit 12 and CPU 11. CPU 11 thus recognizes all the data having been transferred, so that it initializes again DMAC 10 after preparing and setting the next data to be transferred into the memory 13.

If the control register 260 (FIG. 2) is set with information for deactivating the DMA count control circuit 250, the control signal 205 remains low to invalidate the signal 204. In this case, DMAC 10 performs a conventional DMA-transfer using the DMA address generating circuit 230 and the terminal count control circuit 240. In place of setting the register 260 with information for deactivating the DMA count control circuit 250, the register 410 may be set with a value which never becomes equal to the content indicated by the counter 430. No equality signal 401 is thereby produced by the comparator circuit 420. This is equivalent to the deactivation of the DMA count control circuit 250.

According to the present invention, each DMA transfer round in which DMA transfer is repeated a preset number of times at one DMA request can be followed by the next DMA-transfer round without initialization of DMAC 10 by CPU 11. Therefore, so far as the memory 13 area in memory from which DMA transfer of data is transferred is indicated by successive addresses or addresses with a predetermined relationship, it is possible to perform the data transfer without needing initialization by the CPU at each DMA request, contributing to much offloading of the proceeding function of CPU.

Figure 7:
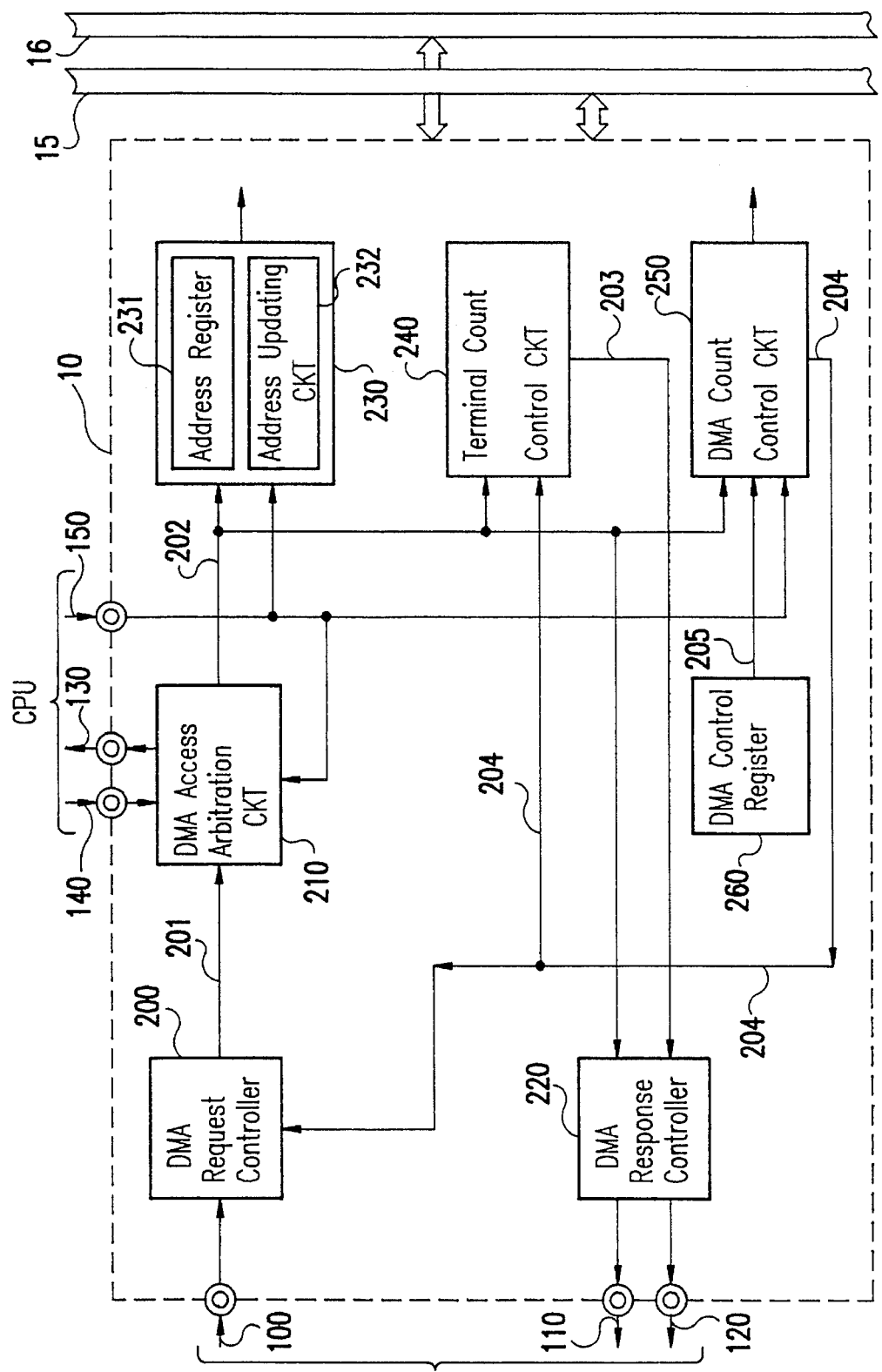
FIG. 7 is a block diagram of a DMA controller according to a second embodiment of the present invention.

Referring to FIG. 7, the DMAC according to a second embodiment of the present invention is distinguished from DMAC of FIG. 2 in that the equality detection signal 204 from the DMA count control circuit 250 is supplied as a control signal to the terminal count control circuit 240. Other constructional parts are the same as those shown in FIG. 2. The signal 204 is supplied to the AND gate circuit 30 instead of bus cycle reference signal 150. Accordingly, each time the detection signal 204 is produced, the content of the terminal count register 310 is decremented by one. Since the content of the counter 310 is decremented after a plurality of data units ("4" in the above description) are transferred, the register 310 is initially set with information representing how many DMA request signals 100 can be received. In the above description, "10" is set into the counter 310.

According to this embodiment, the terminal count register 310 can be constituted with the smaller number of bits. The decrementer 320 is also constituted with a smaller scale.

Figure 8:
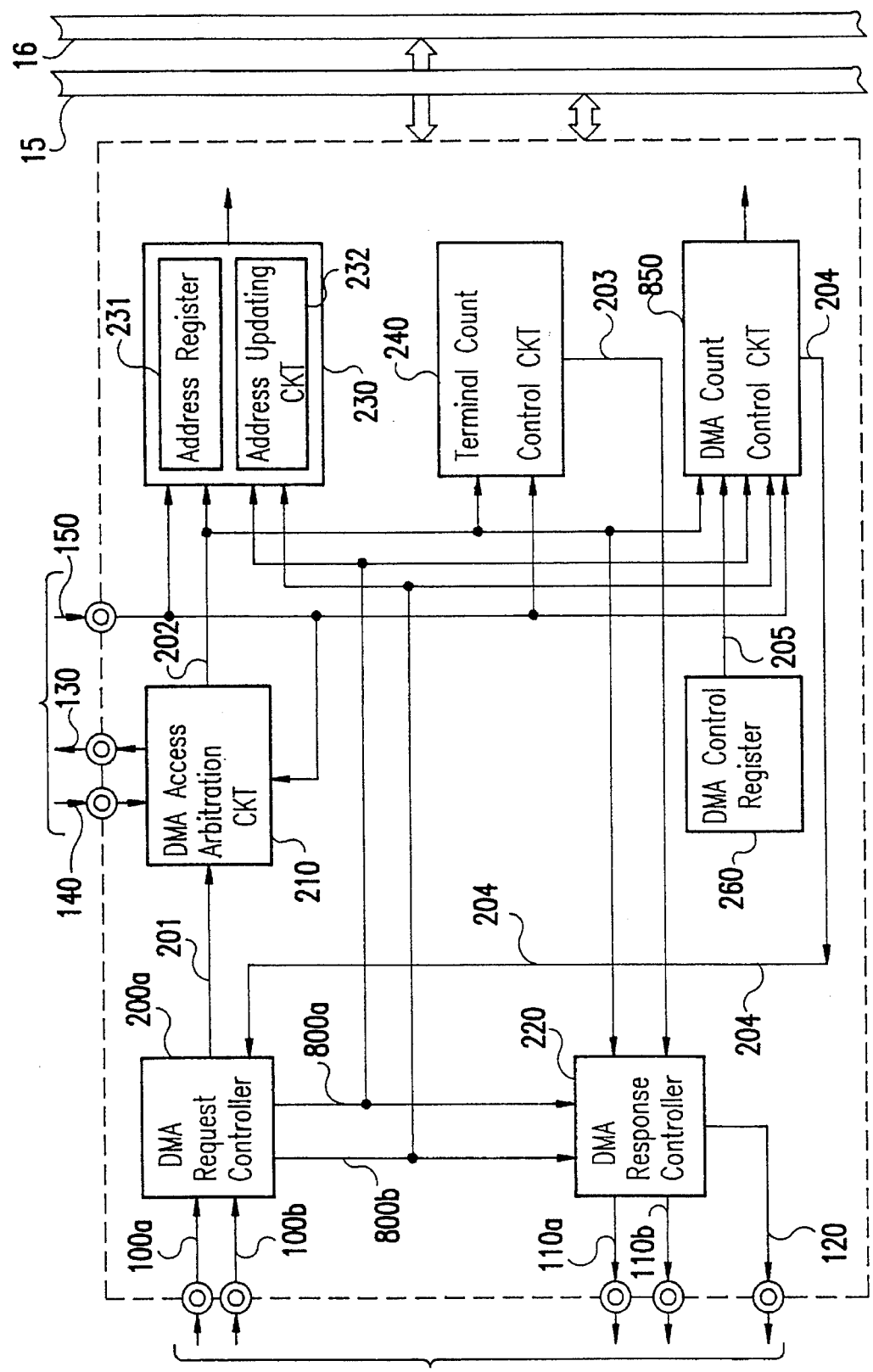
FIG. 8 is a block diagram of a DMA controller according to a third embodiment of the present invention.

Referring to FIG. 8, there is shown DMAC according to a third embodiment of the present invention. This DMAC responds to two kinds of DMA request signals 100a and 100b from the peripheral unit 12 to enable to select different DMA transfer in accordance with which kind of DMA request signal is sent. More specifically, DMA request control circuit 200a has two inputs supplied with signals 100a and 100b. Once either of the input signals goes active, it responds to this by sending the request flag signal 201 to the DMA access arbitration circuit 210, and at the same time causing either one of the channel selection signals 800a and 800b to go active. The signals 800a and 800b are supplied to a DMA count control circuit 850 which further receives the bus cycle reference signal 150, the DMA execution acknowledge signal 202, and the activation control signal 205.

Figure 9:
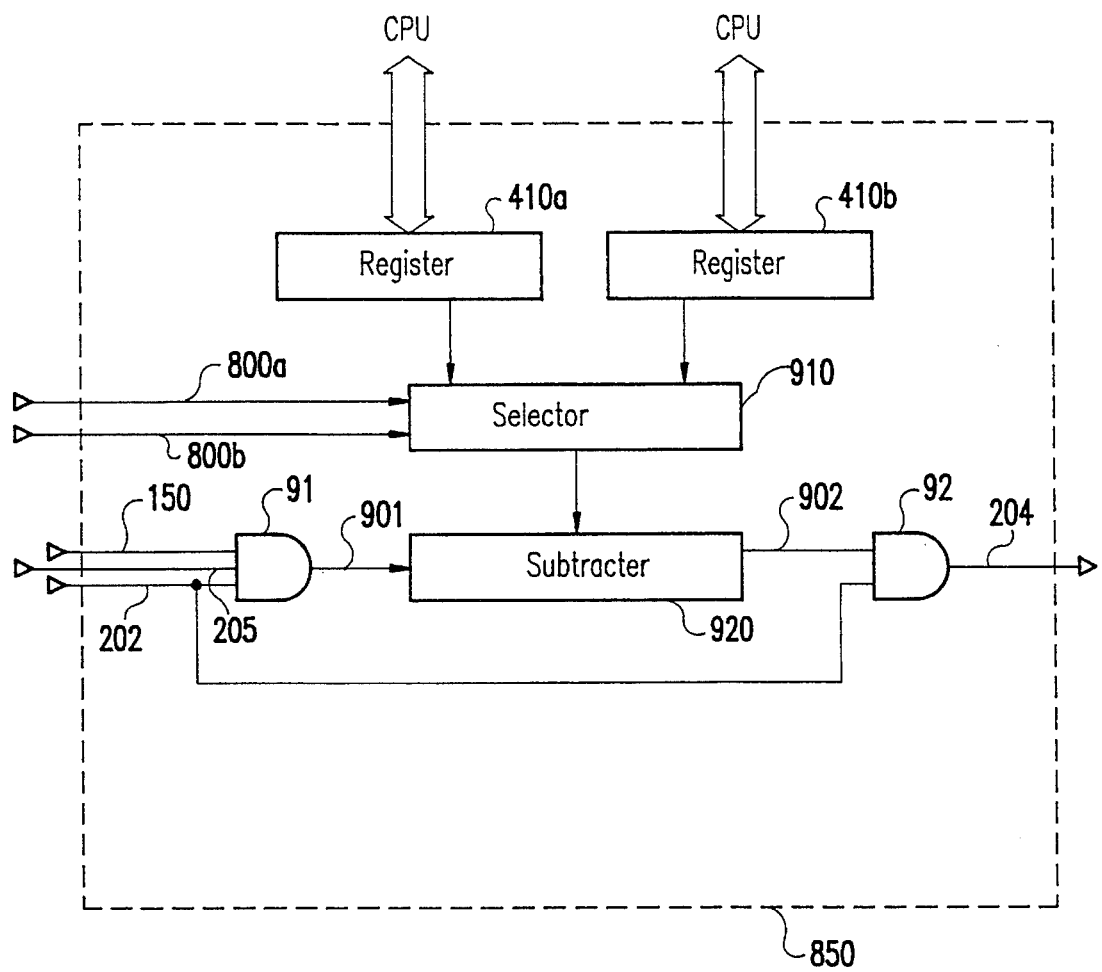
FIG. 9 is a block diagram of a terminal count control circuit shown in FIG. 8.

Referring to FIG. 9, the circuit 850 includes registers 410a and 410b each storing information representing how many data units are to be transferred in response to one DMA transfer request, a selector 910 selecting and outputting either one of the data stored in the registers 410a and 410b in response to the signals of 800a and 800b, an AND gate circuit 91 supplied with the bus cycle reference signal 150, the DMA acknowledge signal 202 and the activation signal 205 and outputting a count signal 901, a subtracter 920 subtracting the data of the selector 910 by one in response to each count signal 901 and outputting a zero detection signal 902 when the subtracted resultant becomes zero, and an AND gate 92 responding to the zero detection signal 902 and the DMA acknowledge signal 202 to output the equality detection signal 204.

The operation of this DMAC will be described with reference also to FIG. 10. CPU 11 (FIG. 1) performs initialization of DMAC 10 by the program before the DMA transfer process. Initialization of the DMA control register 260, the address register 231 and the terminal count control circuit 240 is the same as that in the first embodiment and hence the description of it is omitted. In the DMA count control circuit 850, the registers 410a and 410b are set with different data. In this description, the register 410a is set with "3" and the register 410b to "4".

When the peripheral unit 12 sends the DMA request signal 100a to DMAC 10, the DMA request control circuit 200a changes both the request flag 201 and the channel selection signal 800a to the active level. In response to the signal 800a, the selector 910 sends the data of the register 410a, "3", to the subtracter 920 (see bus cycle (A) in FIG. 10). On the other hand, the DMA access arbitration circuit 210 sends a bus control request signal 130 to CPU 11 to get the bus usage right. CPU 11 returns the acknowledge signal 140. In response thereto, the DMA access arbitration circuit 210 produces the active DMA execution signal 202 (see bus cycle (B) in FIG. 10) to initiate the DMA execution cycle.

In the DMA execution cycle, in synchronism with the bus cycle reference signal 150, the read bus cycle is performed using the content of the address register 231 (FIG. 2) to read out the data from the memory 13. The read-out data is thus transferred to the peripheral unit 12 via the data bus 15.

Figure 10:
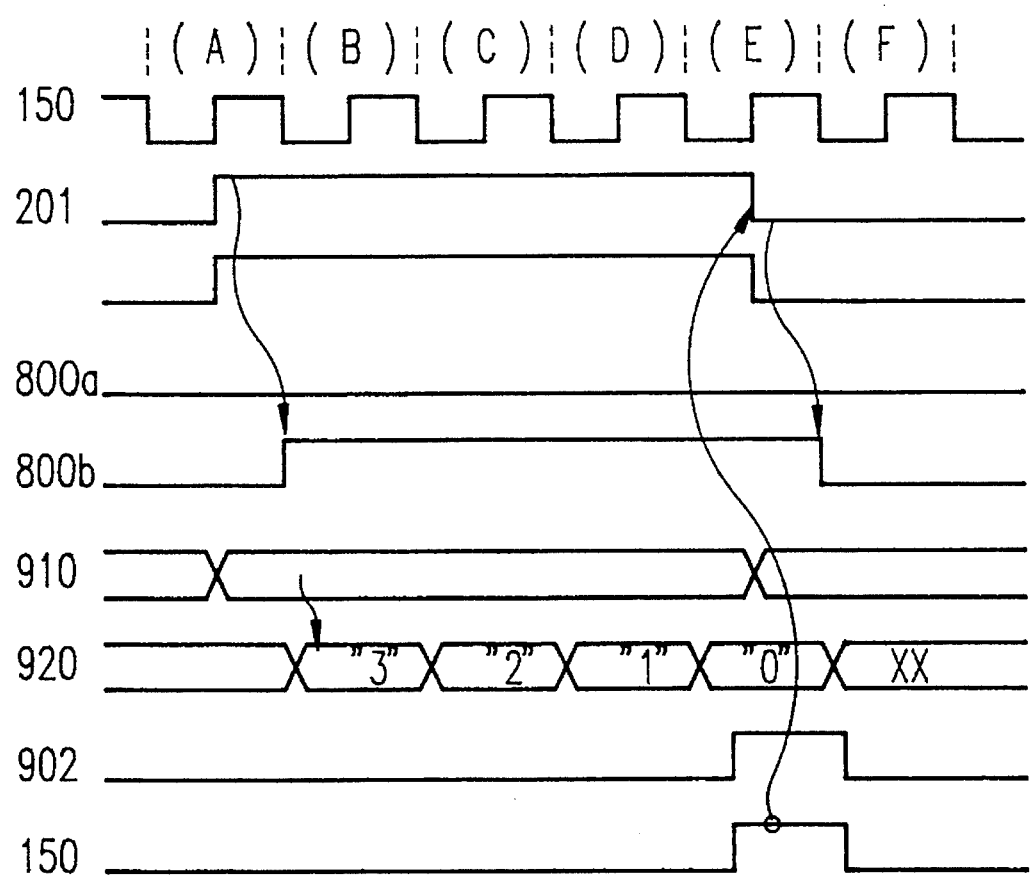
FIG. 10 is a timing chart for illustrating an operation of the third embodiment of the present invention.

In the DMA count control circuit 850, the count signal 901 is produced every bus cycle, so that the subtracter 920 decrements the content from the register 410a (see bus cycles (C) and (D) in FIG. 10). When the DMA-transfer is repeated four times to transfer four words of data to the unit 12, the subtracter circuit 920 produces the signal 920 (see bus cycle (E) in FIG. 10). The equality detection signal 204 is thereby generated.

In response to the signal 204, the DMA request control circuit 200a resets the request flag signal 201, resulting in that the DMA access arbitration circuit 210 withdraws the bus-control request signal 130 to suspend the DMA-transfer. CPU 11 thereby resumes the suspended program operation.

When the next DMA request signal 100a is generated again, the same DMA-transfer procedure as delineated above is repeated four times. When all the data prepared in the memory 13 are transferred to the unit 12, the terminal count control circuit 240 produces the DMA end detection signal 203. In response to the signal 203, the DMA response control circuit 220 sends the DMA end signal 120 to the unit 12 and CPU 11.

In the case where another peripheral device, which needs five words of data per one transfer request, produces the DMA request signal 100b, the register 410b is selected by the signal 800b. Thus, the data transfer is repeated to transfer five words of data to the peripheral unit.

DMA count control circuit 850, instead of generating the equality detection signal 204 by the subtracter 920, may be constructed in the same way as DMA count control circuit 250 shown in FIG. 4.

On the contrary, DMA count control circuit 250 shown in FIG. 4 may be constructed so as to decrement the value of DMA-transfer NPR register 410 by a subtracter circuit, in the same way as the construction of DMA count control circuit 850, and thus can use the zero-detection signal as equality detection signal.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the scope of the invention.

What is claimed is:

1. A data transfer controller for performing a data transfer from a data source to a data destination unit in response to a transfer request signal generated from said data destination unit, said controller comprising:

first register means for storing address information for accessing a source area of said data source, said source area storing a plurality of data units to be transferred, said address information being updated each time a data unit is transferred from said data source to said data destination unit, second register means for storing a first number indicative of an amount of said data units stored in said source area, third register means for storing a second number indicative of a number of data transfers to be successively performed from said source area to said data destination unit each time said data destination unit generates said transfer request signal, said second number being smaller than said first number, data transfer means coupled to said first and third register means for successively performing a plurality of data transfers each time said data destination unit generates said transfer request signal to thereby successively transfer the data stored in said source area to said data destination unit during a number of data transfers designated by the second number in said third register means, and signaling means, coupled to said second register means and said data transfer means, for generating a transfer completion signal when a total number of data units transferred from said data source to said data destination unit by said plurality of data transfers reaches said first number stored in said second register means, wherein said data transfer controller is initialized only after said transfer completion signal is generated.

2. The data transfer controller recited in claim 1 further comprising an address updating circuit connected to said first register means and responsive to said data transfer means for updating address information stored in said first register means as said data unit is transferred in response to said transfer request signal.

3. The data transfer controller recited in claim 1 wherein said signaling means comprises:

decrementing means connected to said second register means for decrementing a number, initially equal to said first number, each time one of said data units is transferred, and zero detector means connected to said decrementing means for generating said transfer completion signal when said number is decremented to zero.

4. The data transfer controller recited in claim 1 further comprising:

counter means coupled to said third register means for counting each data unit transferred, and comparator means connected to said counter means and said third register means for generating an equality signal when said counter means produces a count equal to said second number stored in said third register means, said data transfer means being responsive to said equality signal.

5. A data transfer controller according to claim 1, wherein said transfer completion signal is generated only after said first number in said second register means has been reached and wherein when said transfer completion signal is generated, said data transfer controller is initialized.

6. A data transfer controller coupled through a bus to a central processing unit, a memory and a peripheral unit and transferring data from said memory to said peripheral unit through said bus in place of said central processing unit in response to a transfer request signal generated from said peripheral unit, said controller comprising:

first register means for storing address information for accessing an area of said memory, said area storing a plurality of data units to be transferred, bus control means responsive to each of said transfer request signals from said peripheral unit for requesting a bus control right for controlling said bus from said central processing unit, second register means for storing a first number indicative of an amount of said data units stored in said area of said memory, one of said data units stored in said area of said memory being transferred to said peripheral unit by performing a bus cycle once, third register means for storing a second number of data transfers to be successively performed each time said peripheral unit generates said data transfer request signal, said second number stored in said third register means being smaller than said first number stored in said second register means, data transfer means, coupled to said first and second register means and said bus control means, for successively performing a plurality of data transfers each time said data peripheral unit generates said transfer request signal to thereby successively transfer a plurality of the data in said memory to said peripheral unit during a number of data transfers designated by said second number in said third register means, detector means for returning said bus control right to said central processing unit after each of the data transfers of said plurality of data transfers represented by said number in said third register means is performed by said data transfer means, signaling means coupled to said second register means and said data transfer means for informing said central processing unit of the completion of a data transfer when the data transfer performed by said data transfer means reaches said second number stored in said third register means.

7. The data transfer controller recited in claim 6 further comprising an address updating circuit connected to said first register means and responsive to said data transfer means for updating said address information stored in said first register means as said data unit is transferred in response to each of said transfer request signal of said peripheral unit.

8. The data transfer controller recited in claim 6 wherein said detector means comprises:

decrementing means connected to said second register means for decrementing a number, initially equal to said first number, each time said data unit is transferred, and zero detector means connected to said decrementing means for generating said transfer completion signal when said number is decremented to zero.

9. The data transfer controller recited in claim 8, wherein said decrementing means is responsive to said data transfer means.

10. The data transfer controller recited in claim 6 wherein said signaling means comprises:

counter means coupled to said third register means for counting each data unit transferred, and comparator means connected to said counter means and said third register means for generating an equality signal when said counter means produces a count equal to said second number stored in said third register means, said data transfer means being responsive to said equality signal.

11. The data transfer controller recited in claim 6, wherein said third register means includes first and second registers and a selector for selectively outputting the contents of said first and second registers.

12. A data transfer controller according to claim 6, wherein said signalling means generates a transfer completion signal only after said first number in said second register means has been reached and wherein when said transfer completion signal is generated, said data transfer controller is initialized.

13. A data transfer controller according to claim 6, wherein said data transfer controller is initialized only after said signalling means informs the central processing unit of the completion of data transfer.

14. A direct memory access (DMA) data transfer controller for transferring data directly between a memory and a peripheral unit, said controller comprising:
- a DMA address generating circuit including a first register for storing address information for accessing an area of said memory storing data to be transferred,
- a DMA request controller and access arbitration circuit, responsive to each transfer request from said peripheral unit, for requesting a bus control right from a central processing unit (CPU),
- a terminal count control circuit including second register means for storing a number of cycles to be performed each time said transfer request is generated from said peripheral unit, one of said data stored in said area of said memory being transferred to said peripheral unit by performing a bus cycle once,
- a DMA count control circuit including third and fourth registers each storing a different number of bus cycles to be performed in response to a transfer request;
- a selector connected to said second and third registers for selecting information stored in one of said third and fourth registers, depending on a type of transfer request from said peripheral unit;
- said central processing unit generating a bus cycle signal coupled to said DMA address generating circuit, said DMA terminal count control circuit and said DMA request controller and access arbitration circuit performing a data transfer between said memory and said peripheral unit a number of times corresponding to said number of cycles stored in said second register;
- a detector for returning said bus control right to said central processing unit after each of said data transfers of said plurality of data transfers designated by said number of cycles stored in said second register, is performed; and
- a DMA response controller coupled to said terminal count control circuit for informing said central processing unit of the completion of a data transfer when the bus cycle performed reaches a number represented by the number stored in said second register.

15. The data transfer controller recited in claim 14 further comprising:
- a subtractor connected to said selector means for decrementing a number, initially equal to said number of data units ready to be transferred, each time a data unit is transferred, and
- an AND gate connected to said subtractor for generating a transfer completion signal when said number is decremented to zero.

16. An information processing device, comprising:
a bus;
a memory coupled to said bus;
a destination unit coupled to said bus and generating a transfer request signal;
a central processing unit coupled to said bus and receiving a bus control request signal, a bus control returning signal and a transfer completion signal; and
a data transfer controller coupled to said bus, said data transfer controller for receiving said transfer request signal and generating said bus control request signal, said bus control returning signal and said transfer completion signal;
wherein said data transfer controller comprises:
- a first register for storing address information for accessing an area of said memory, said area storing a plurality of data units to be transferred;
- a second register for storing a first number indicative of a total number of data transfers;
- a third register for storing a second number of data transfer to be successively performed each time said destination unit generates said data transfer request signal;
- a bus control circuit for sending said bus control requesting signal responsive to each of said transfer request signals from said destination unit;
- a data transfer circuit coupled to said first and second registers and said bus control circuit for successively performing a plurality of data transfers each time said data destination unit generates said transfer request signal to thereby successively transfer a plurality of the data units in said memory to said destination unit during a number of transfers designated by said second number stored in said third register;
- a detecting circuit for sending said bus control returning signal after each of the data transfers of the plurality of data transfers designated by said second number stored in said third register, is performed by said data transfer circuit; and
- a signaling circuit coupled to said second register and said data transfer circuit for sending said transfer completion signal when the data transfers performed by said data transfer circuit reaches said second number stored in said second register,
wherein said central processing unit sets contents of said data transfer controller when said destination unit sends said transfer request signal after said data transfer controller generates said transfer completion signal.

17. An information processing device according to claim 16, wherein said third register comprises fourth and fifth registers and a selector outputs contents of one of said third and fourth registers.

18. An information processing device, comprising:
a bus;
a memory coupled to said bus;
a destination unit coupled to said bus and generating a transfer request signal;
a central processing unit coupled to said bus and receiving a bus control request signal, a bus control returning signal and a transfer completion signal; and
a data transfer controller coupled to said bus, said data transfer controller receiving said transfer request signal and generating said bus control request signal, said bus control returning signal and said transfer completion signal,
wherein said data transfer controller comprises:
- a first register for storing address information for accessing an area of said memory, said area for storing a plurality of data units to be transferred;
- a second register for storing a first number;
- a third register for storing a second number of data transfer to be successively performed each time said destination unit generates said data transfer request signal;
- a bus control circuit for sending said bus control requesting signal responsive to each of said transfer request signal from said destination unit;

a data transfer circuit, coupled to said first and second registers and said bus control circuit, for successively performing a plurality of data transfers each time said data destination unit generates said transfer request signal, to thereby successively transfer a plurality of the data in said memory to said destination unit during a number of data transfers designated by said second number in said third register;

a detecting circuit for sending said bus control returning signal after each of the data transfers of the plurality of data transfers designated by said number in said third register, is performed by said data transfer circuit;

a signaling circuit, coupled to said second register and said dam transfer circuit, for sending said transfer completion signal when a number of said transfer request signals generated by said destination unit reaches said first number stored in said second register, wherein said central processing unit sets contents of said data transfer controller when said destination unit sends said transfer request signal after said data transfer controller generates said transfer completion signal.

19. An information processing device according to claim 18, wherein said third register comprises fourth and fifth registers and a selector outputs contents of one of said third and fourth registers.

* * * * *